Patented Oct. 28, 1924.

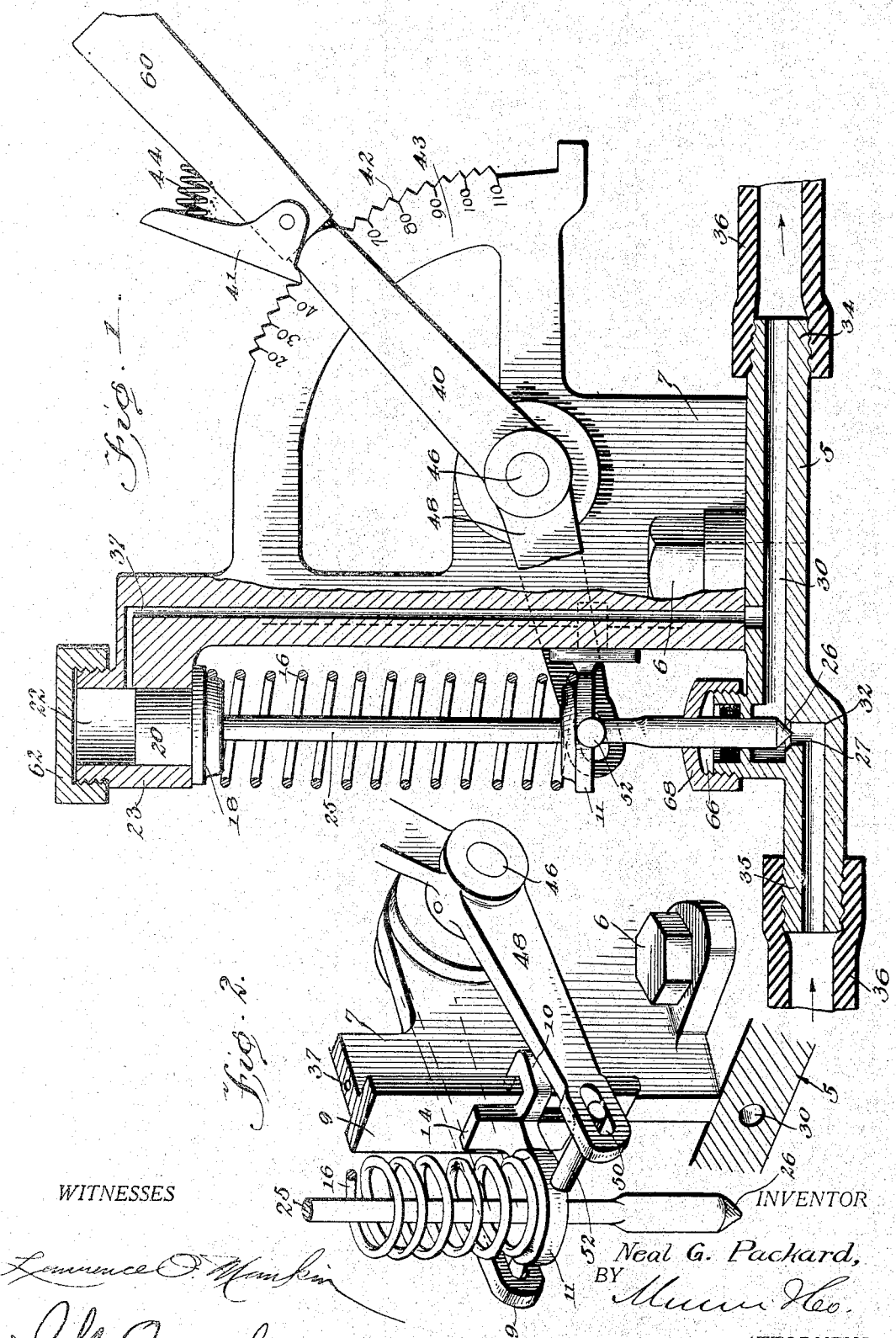

1,513,064

UNITED STATES PATENT OFFICE.

NEAL GEORGE PACKARD, OF SAND SPRINGS, OKLAHOMA.

AUTOMATIC CUT-OUT.

Application filed July 23, 1923. Serial No. 653,360.

*To all whom it may concern:*

Be it known that I, NEAL GEORGE PACKARD, a citizen of the United States, and resident of Sand Springs, in the county of Tulsa and State of Oklahoma, have made certain new and useful Improvements in Automatic Cut-Outs, of which the following is a specification.

An important object of this invention is to provide an automatic cut off adapted for use in air lines and having simple means whereby to automatically cut off the air when the pressure in the tire being supplied with air reaches a predetermined point.

A further object of the invention is to provide an automatic cut off which may be quickly adjusted for operation at the desired pressure.

Further the invention forming the subject matter of this application aims to provide an automatic cut-off means which may be interposed at any desired point in the air line, which is of highly simplified construction and comparatively cheap to manufacture.

Other objects and advantages will be apparent during the course of the following description.

In the accompanying drawing forming a part of this application and in which like numerals are employed to designate like parts throughout the same, Figure 1 is a side elevation of the improved cut off apparatus, parts being shown in section.

Figure 2 is a fragmentary perspective of the improved cut-off apparatus.

In the drawing wherein for the purpose of illustration is shown a preferred embodiment of the invention, the numeral 5 designates a base designed to be securely held in position on a suitable support by means of fastening devices 6 in the nature of bolts, cap screws or the like.

Figure 2 illustrates that a standard or wall 7 is mounted upon the base 5 and is provided at its forward edge with laterally projecting guide ribs 9 to which the approximately U-shaped attaching members 10 of a bracket 11 are slidably connected. Upon further reference to this figure it will be observed that the bracket 11 in addition to being provided with the U-shaped guide lugs 10 is formed with contact portions 14 which bear flatly against the outer surfaces of the ribs 9 and thereby hold the bracket 11 in a horizontal position. In carrying out the invention the bracket 11 is free to be moved vertically for varying the tension of a coiled spring 16.

Figure 1 illustrates that the upper portion of the coiled spring 16 is engaged with an annular shoulder 18 formed at the lower end of a piston 20, the said piston being movable in the chamber 22 of a cylinder 23.

As the air pressure in the chamber 22 increases the piston 20 is moved downwardly so as to impart a corresponding movement to a stem 25, the lower portion of which is provided with a valve 26 to contact with a valve seat 27. The base 5 is provided with an air passage or channel 30 having an offset 32 in which the valve seat 27 is located and it will be seen that the opposite ends of the base are formed with stems 34 and 35 which communicate with the channel 30 and have connection with the sections 36 of the air line.

One of the sections of the air line is of course adapted for connection with the valve stem of a tire and when the pressure of the air in the tire reaches a predetermined point it will back up through a branch 37 in the upright 7 and will enter the chamber 22 for actuating the piston 20 against the tension of the coiled spring 16.

The tension of the coiled spring 16 may be varied by the lever 40 having a dog 41 pivoted thereto and adapted to engage one of a series of teeth 42 on a segment or rack 43. The dog is actuated by a coiled spring 44 and when the dog is manually depressed its position may be conveniently changed. As the lever 40 is moved about the axis of the pin 46 the forward branch 48 of the lever is either raised or lowered. Figure 2 plainly illustrates that the forward branch 48 is slotted as indicated at 50 and receives one of the laterally projecting pins 52 of the bracket 11 so as to operate the bracket. That is to say when the forward branch 48 of the lever is raised the bracket 11 will be raised and the tension of the coiled spring increased so that a higher air pressure will be required to move the piston 20 downwardly and unseat the valve 26.

In operation the improved air cut off is interposed at any desired point in the air line and as the tire is inflated the back pressure will act on the piston 20 and seat the valve 26. If it is desired to automatically cut off the pressure of 45 lbs. the dog 41 is positioned as illustrated and the tension of the spring 16 will resist the closing of the valve until a pressure of 45 lbs. has been reached. The pressure at which the cut off operates may be conveniently varied by swinging the handle 60 up or down on the arcuate rack 43.

Attention is directed to the fact that the shoulder 18 not only constitutes a stop or abutment for one end of the coiled spring 16 but also engages the under side of the cylinder 23 and thereby limits the movement of the piston 20 in the chamber 22. The cap 62 on the cylinder 23 may be sealed in any suitable manner to prevent the escape of air. Furthermore, the packing 66 is located about the valve 26 and is pressed into position by means of a cap 68 threaded onto an annular extension on the upper side of the base.

Having thus described the invention, what is claimed is:—

1. An automatic cut off for air lines comprising a base having a passage for air, an upright mounted on the base and having a branch passage communicating with said first named passage, a valve controlling the movement of air through said first named passage and having a piston, said upright being provided with a cylinder receiving said piston and communicating with said branch passage, a spring resisting the closing of said valve, and a bracket having engagement with one end of said spring and having sliding connection with said upright.

2. An automatic cut off for air lines comprising a base having a passage for air, an upright mounted on the base and having a branch passage communicating with said first named passage, a valve controlling the movement of air through said first named passage and having a piston, said upright being provided with a cylinder having a chamber receiving said piston and communicating with said branch passage, a spring resisting the closing of said valve, a bracket having engagement with one end of said spring and having sliding connection with said upright, and a lever connected to said upright and having a branch connected to said bracket for positioning the same and varying the tension of said coiled spring.

3. An automatic cut-off for air lines comprising a base having a passage for air, an upright mounted on the base and having a branch passage communicating with said first named passage, a valve controlling the movement of air through said first named passage and having a piston, said upright being provided with a cylinder having a chamber receiving said piston and communicating with said branch passage, a spring resisting the closing of said valve, a bracket having engagement with one end of said spring and having sliding connection with said upright, a lever connected to said upright and having a branch connected to said bracket for positioning the same and varying the tension of said coiled spring, and means whereby to hold said lever in a set position.

4. An automatic cut-off for air lines comprising a base having an air passage, an upright mounted on the base and having guide ribs, a bracket having lugs slidably connected to said ribs, a valve for controlling the movement of air through said passage, and having a stem provided with a piston, said piston being provided with an annular shoulder, a spring confined between said shoulder and said bracket, said upright being provided with a cylinder receiving said piston, and means whereby to adjust said bracket for varying the tension of said spring.

5. An automatic cut off for air lines comprising a base having an air passage, an upright mounted on the base and having laterally projecting guide ribs, a bracket having U-shaped lugs slidably connected to said ribs, a valve for controlling the movement of air through said passage and having a stem provided with a piston, said piston being provided with an annular shoulder, a coiled spring confined between said shoulder and said bracket, the upper portion of said upright being provided with a cylinder receiving said piston, and means whereby to adjust the bracket vertically for varying the tension of said coiled spring, said chamber having communication with said passage.

6. An automatic cut off for air lines comprising an air conducting member, a valve for controlling the passage of air through said air conducting member, said air conducting member being provided with an upright having a chamber and having a rack, said rack being provided with a plurality of teeth and with calibrations, a pressure actuated piston received in said chamber and having connection with said valve, a coiled spring resisting the closing movement of said valve, a lever connected to said upright and having connection with said coiled spring, a dog carried by said lever and adapted for engagement with said teeth to hold the lever in a predetermined position, said upright being provided with means establishing communication between said air conducting member and said chamber.

7. An automatic cut-off for air lines comprising a body having an air passage, a valve controlling the passage and having a piston, a cylinder receiving the piston, means establishing communication between the cylinder and said air passage at a point between the valve in the air passage and the point of use of the air, a bracket, a coil spring engaged with the bracket, and a lever having connection with the bracket and adapted for adjusting the same whereby to vary the tension of the spring.

NEAL GEORGE PACKARD.